US009106709B2

(12) United States Patent
Desilva et al.

(10) Patent No.: US 9,106,709 B2
(45) Date of Patent: Aug. 11, 2015

(54) SERVER SIDE MOBILE AUDIENCE INTELLIGENCE CREATION

(75) Inventors: Mahi Desilva, San Mateo, CA (US); Sameer Merchant, San Mateo, CA (US); Lawrence W. Moores, San Mateo, CA (US)

(73) Assignee: OPERA SOFTWARE ASA, Oslo (NO)

( * ) Notice: Subject to any disclaimer, the term of this patent is extended or adjusted under 35 U.S.C. 154(b) by 755 days.

(21) Appl. No.: 13/240,514

(22) Filed: Sep. 22, 2011

(65) Prior Publication Data

US 2013/0080498 A1 Mar. 28, 2013

(51) Int. Cl.
*G06F 15/16* (2006.01)
*H04L 29/08* (2006.01)
*G06Q 30/02* (2012.01)

(52) U.S. Cl.
CPC ............... *H04L 67/22* (2013.01); *H04L 67/02* (2013.01); *H04L 67/28* (2013.01); *H04L 67/30* (2013.01); *G06Q 30/0201* (2013.01); *G06Q 30/0277* (2013.01)

(58) Field of Classification Search
CPC ...................................................... H04L 9/32
USPC .......................................... 709/201, 203, 223
See application file for complete search history.

(56) References Cited

U.S. PATENT DOCUMENTS

| | | | |
|---|---|---|---|
| 6,041,360 A * | 3/2000 | Himmel et al. | 709/245 |
| 6,615,253 B1 * | 9/2003 | Bowman-Amuah | 709/219 |
| 8,086,226 B2 * | 12/2011 | Lin et al. | 455/418 |
| 2006/0265507 A1 | 11/2006 | Banga et al. | |
| 2008/0010368 A1 * | 1/2008 | Hubbard et al. | 709/223 |
| 2008/0126176 A1 * | 5/2008 | Iguchi | 705/10 |
| 2009/0282468 A1 | 11/2009 | Banga et al. | |
| 2009/0313387 A1 * | 12/2009 | Major et al. | 709/246 |

OTHER PUBLICATIONS

Hsiao et al., "Versatile Transcoding Proxy for Internet Content Adaptation," IEEE Transactions on Multimedia, vol. 10, No. 4, Jun. 2008, pp. 646-658, XP011214864.

* cited by examiner

*Primary Examiner* — David Lazaro
*Assistant Examiner* — Zia Khurshid
(74) *Attorney, Agent, or Firm* — Birch, Stewart, Kolasch & Brich, LLP

(57) ABSTRACT

The present invention is directed toward a method and system for tracking webpage requests from web browsers without invading the privacy of the corresponding users. A server receives the webpage requests, and extracts from each of them a user-neutral identifier and URL. The server creates records of these webpage requests, and these records are used to create and update profiles for the corresponding user-neutral identifiers. Since the user-neutral identifiers are not tied to user-specific information, the profiles are made anonymous and user privacy can be protected. However, since each user-neutral identifier is tied to a particular web browser, useful information regarding individual browsing behavior can be obtained. Furthermore, the requested URL's can be categorized before being used to update the profiles, thus eliminating concerns that a user's browsing activity might be tracked from website to website.

19 Claims, 7 Drawing Sheets

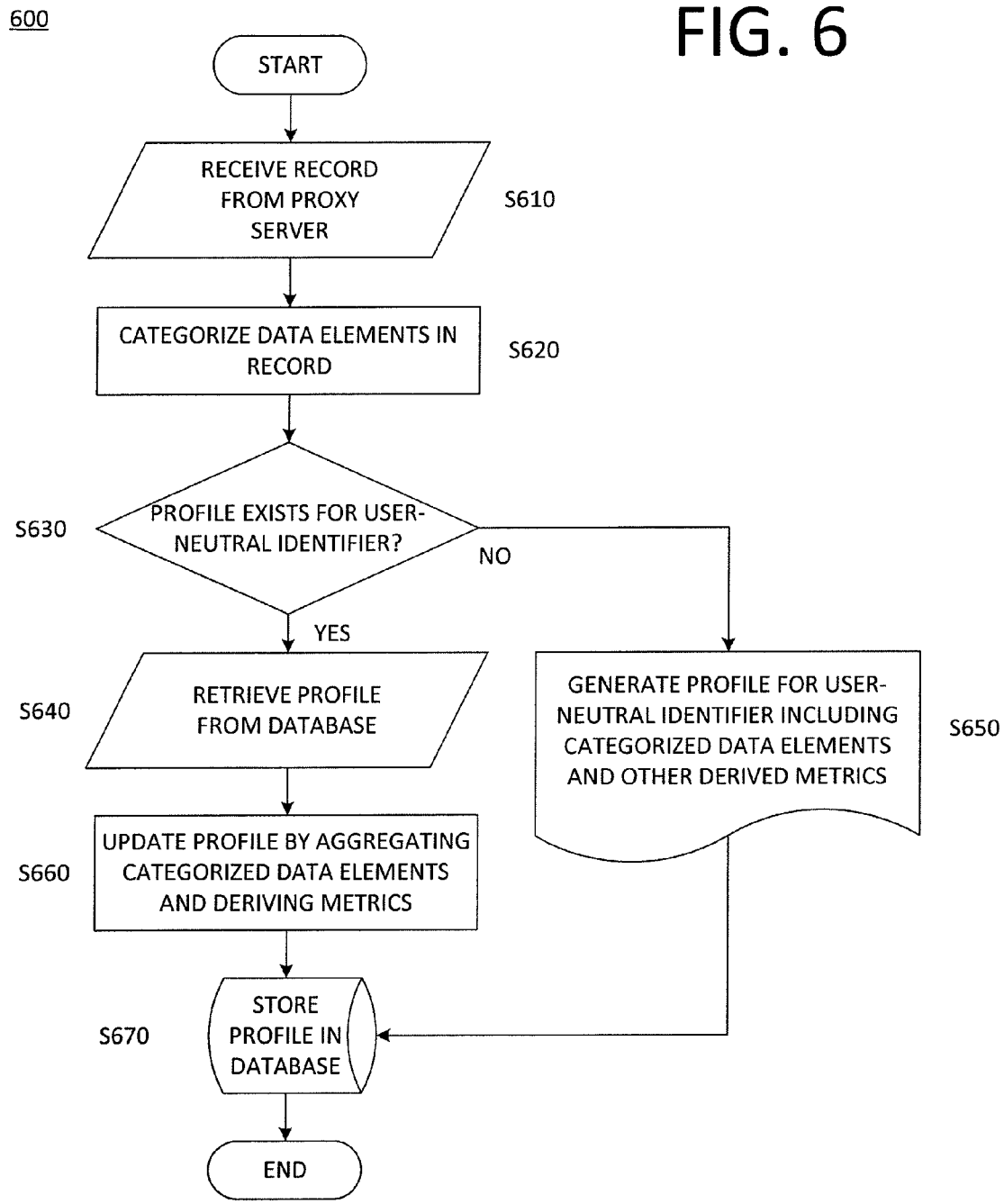

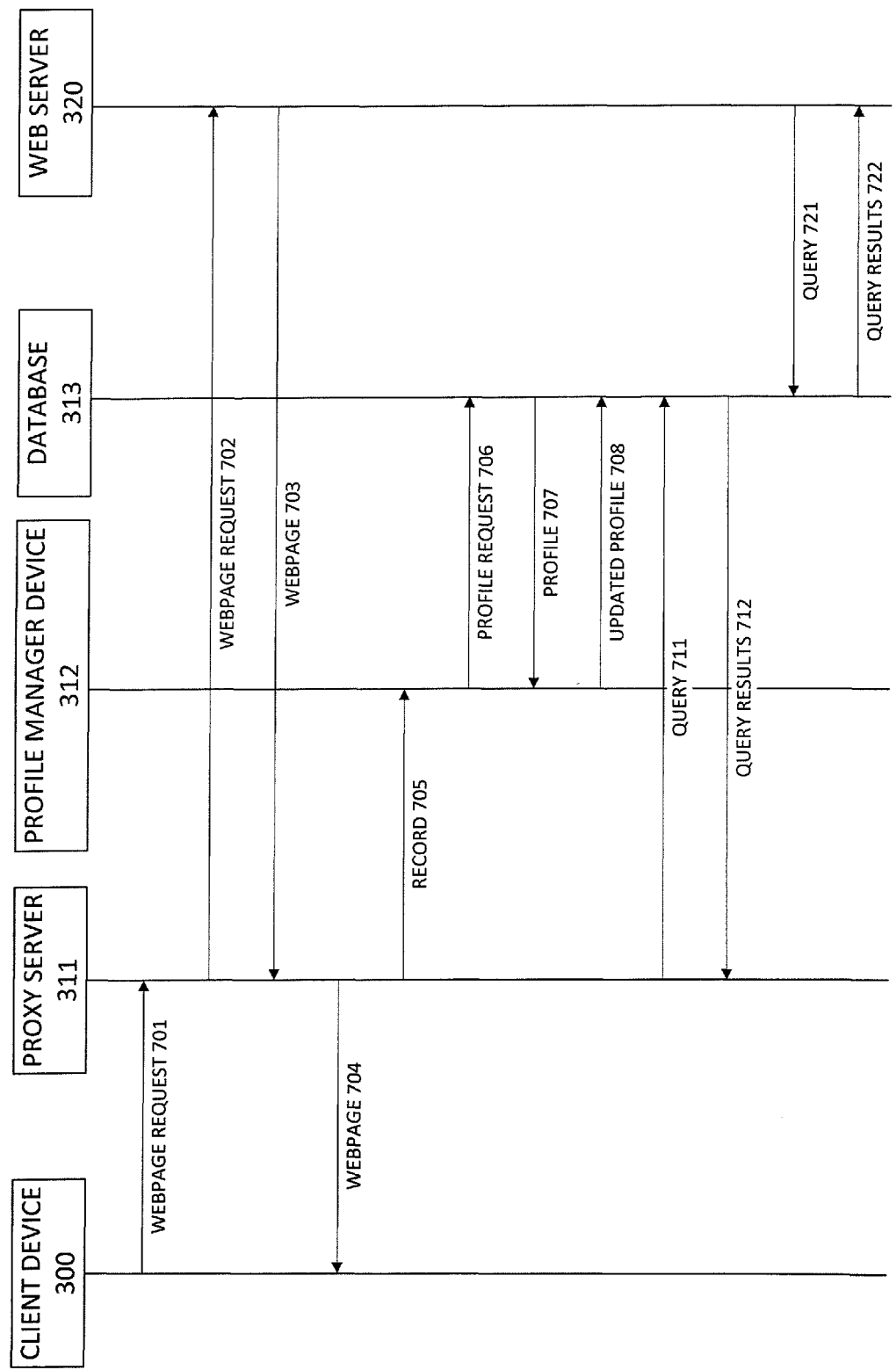

SERVER SIDE MOBILE AUDIENCE INTELLIGENCE CREATION

FIELD OF THE INVENTION

The invention relates generally to collecting information from a web browser, and more particularly to the anonymous tracking of the browsing history on a particular device.

BACKGROUND OF THE INVENTION

Currently, individual websites and advertisers use "cookies" to track and collect information on users' behaviors and affinities, as well as personalize content to individual users. A cookie is a type of file stored to the user's device by the device's browser. Such files are also referred to as "web cookies," "browser cookies," and "HTTP cookies."

Essentially, cookies are pieces of data sent to the browser by a website's web server. When the user initiates a request for a web page, the browser returns these pieces of data to the server, thereby introducing a state (memory of previous events) into an otherwise stateless hypertext transfer protocol (HTTP) transaction. Without cookies, each request for a webpage or component of a webpage is an isolated event. Other than being set by a web server, cookies can also be set by a script in a language such as JavaScript, if supported and enabled by the web browser.

Cookies are often used to track Internet users' web browsing habits. While this can also be done at some level by using internet protocol (IP) addresses, cookies provide greater precision and assurance of uniqueness of an individual. The general process for creating and using such cookies is described below.

The process is initiated when a browser on a client device sends a request to a website for a particular webpage. The website and webpage are identified by a uniform resource locator (URL) included in the request. After receiving such request, the website server will attempt to read any cookie previously stored on the client (e.g., by sending a request to the client for a cookie), and discover that the client contains no cookie. Lacking a cookie, the website server assumes this is the first visit by the user. Therefore, the server creates a cookie, and sends it back to the client browser together with a generic version of the requested webpage. On subsequent requests to the same website, the information collected by the cookie is automatically sent by the browser with the request, and the website server may customize the requested webpage based on the data in the cookie. In this way the website can log the cookie along with the corresponding URL requests sent to that site. By analyzing the log file, it is possible to find out which pages on the website the user has visited, and in what sequence.

However, cookies are considered more of a PC-based technology, which tends not to operate as well in a mobile environment. The use of cookies in a mobile environment can be inefficient and fraught with risks. For instance, many mobile devices do not have a browser capable of storing a cookie. Also, mobile devices commonly do not permit applications to store files in a location accessible in the manner required by a cookie. Furthermore, many mobile service providers block the use of cookies, either through management policies on the device or within the network itself. Thus many Internet sites (especially mobile sites) are unable to provide cookie functionality to mobile browsers, resulting in a sub-optimal Internet browsing experience for mobile users. This could result in an inability to gather data regarding a mobile device's browsing history or retain information about the mobile user, thus reducing or eliminating certain functionality. For example, web sites may not be able to offer a mobile user the "remember me" function, or customized and dynamic page presentation based on the user's likes and browsing history.

Since a cookie is generally implemented by a website, they only produce information based on the use of that specific site. While cross-domain cookies (cookies that work across several domain names) and "cookie exchanges" (organizations that attempt to synchronize a view of a user's affinities and behaviors by aggregating information from multiple cookies) exist, they still only collect information regarding a limited number of sites. These approaches lead to a disaggregated view of the user that significantly skews usage patterns, and thus do not accurately reflect the user's affinities, behaviors, etc.

Also, users are more and more frequently accessing websites through multiple devices, such as home and work computers, laptops, web-enabled phones, tablets, and TVs. With the use of multiple web browsers comes a proliferation of cookies, multiple views of a user's affinities and behaviors, and more entities using cookie exchange and cross-domain cookie technologies that expose the user to greater intrusions of privacy.

Risk of exposure of private information is a concern to many consumers. The operation of cookies is essentially hidden from users, and the intentions of the companies employing many of the cookies are unknown. Many mobile users are afraid of the potential exposure of private information to the cookies, and thus do not allow or tolerate cookies on their mobile devices. The propagation of cross-domain cookies and cookie exchanges adds to the lack of security and reliability of the information collected.

As an alternative to cookies, another way to track a user's behavior, affinities, and personal information is by placing a probe, or "packet sniffing" type device, in the network. Such a device can log user interactions at the network level. This technology is usually employed as a program or piece of hardware, which intercepts and logs traffic passing over a digital network. As the data flows across the network, the sniffer or probe captures each packet and, if needed, decodes the packet to reveal the values of the various fields in the packets.

Probe and packet sniffing technologies do not intrude on a device like cookies. However, they do present privacy issues in that they rely on some type of information within the network that is unique to the user such as an account ID, phone number, etc. Since this information is directly linked to an individual who can be personally identified by the network operator, this form of data gathering intrudes upon personally-identifiable information and is hence subject to strict regulatory control.

Other issues are also raised by the use of probe and packet sniffing technology. For example, such technology must be appropriately placed in the network typology in order to collect the traffic of interest. Within a mobile environment, multiple installations may be required thus increasing costs. Further, even multiple installations do not overcome the fact that many users roam outside their service provider's network, and thus have browsing traffic unseen by their home network operator. Also, since many networks are beginning to share capacity, multiple business entities would need to share information to enable a full view of a user's interactions with the Internet. This further raises privacy concerns (and also raises business concerns, e.g., whether customer information should be shared with a competitor). Moreover, today's devices feature more and more multiple access technologies such as Bluetooth and WiFi. When a mobile phone user accesses the Internet via one of these alternative networks, the user's mobile operator remains blind to the traffic created by the user.

SUMMARY OF THE INVENTION

The present invention is directed toward a method and system for tracking webpage requests from web browsers, and using such information to improve the user's browsing experience and/or create market intelligence, without invading the privacy of the corresponding users.

According to an exemplary embodiment, a server receives webpage requests from web browsers and creates records of the requests. Each webpage request may include, in addition to the requested URL, a user-neutral identifier. These user-neutral identifiers are not tied to user-specific information or user activity, thus maintaining the anonymity of the users who issued the requests. However, the user-neutral identifiers may be generated in such manner as to uniquely identify the web browsers that issued the corresponding requests.

According to a further exemplary embodiment, the records of the webpage requests may be processed for purposes of creating and updating profiles for the corresponding user-neutral identifiers. For example, such profiles may be maintained in a database. In a further exemplary embodiment, the requested URL's, as well as other relevant data in the requests, may be categorized within defined categories prior to being used to create or update the profiles. This makes it possible to prevent the tracking of a user's browser activity from website to website, thus further protecting the user's privacy. Further, it is possible to configure the database such that data can be queried according to one or a combination of the defined categories.

In an exemplary embodiment, the server receiving the webpage requests may be configured as a proxy server, which further retrieves the requested webpages from the appropriate web servers and transmits them to the web browsers. Such a proxy server could be implemented, for example, in a mobile environment and thus receive webpage requests from web browsers installed on mobile devices such as phones and tablet computers. For instance, the proxy server (or another device connected thereto) could also be configured to transcode the retrieved webpages according to the processing and display capabilities of the mobile device, to improve the user's browsing experience.

In a further exemplary embodiment, the proxy server may use the profiles to personalize the retrieved webpages to the anonymous users requesting the webpages. Also, information obtained by analyzing the profiles may be used by website publishers to customize content and/or advertising to the interests and behaviors of their audience.

BRIEF DESCRIPTION OF THE DRAWINGS

FIG. 6 is a flow chart illustrating a process performed by a profile manager device according to an exemplary embodiment of the present invention; and FIG. 7 is a data flow diagram illustrating interactions between a client device, a server-side facility, and a web server according to an exemplary embodiment of the present invention.

DETAILED DESCRIPTION

The present invention seeks to improve information gathering and reporting with regard to users' Internet browsing activity. Particularly, exemplary embodiments of the present invention are designed to provide information about a particular user's interests and behavior, as exemplified by that user's browsing activities across multiple web sites and site visits, while enhancing user privacy and empowering the user to restrict the ability of websites to follow him/her across Internet sessions. Using this information, the particular user's browsing experience may be improved (e.g., by tailoring a website to his/her interests), and market intelligence can be obtained.

The principles of the present invention may be implemented in a mobile environment in which users are able to browse the Internet using their mobile devices (phone, tablet computer, etc.), e.g., via a 3G or 4G-compliant network. However, the present invention is not limited to a mobile implementation, and the principles described herein may also be applied to a desktop browsing environment.

According to an exemplary embodiment, a server-side facility can generate records of webpage requests (e.g., URL requests) issued by a particular browser, and then utilize these records to generate and update a profile. To facilitate this, the client browser may generate a unique identifier that is "user-neutral" in the sense that it is not comprised of any information that is specifically associated with a particular user. A web browser is not required to access a webpage to receive the user-neutral identifier, unlike cookies. For instance, this user-neutral identifier may be programmed into the browser before the browser is installed on a user device. It is also possible for the user-neutral identifier to be generated by the browser (or a remote location) after installation of the browser, e.g., when the browser is initiated or used for the first time. At any rate, the user-neutral identifier is embedded as an attribute of the browser, rather than the user, and works across all domains/traffic that might be generated by the user.

Further, the browser may incorporate the user-neutral identifier into its webpage requests prior to transmission, so that the server-side facility can use data from these requests to generate and/or update a profile that corresponds to the user-neutral identifier. This profile can thus provide information regarding a particular user's browsing interests and behavior, while maintaining the user's anonymity.

According to a further exemplary embodiment, after records of the received webpage requests are generated, the server-side facility may categorize certain data elements contained therein (e.g., the requested URL's) prior to updating the profiles. This can help eliminate concerns that a user might have regarding his/her browsing activity being tracked from website to website.

Figure 1:
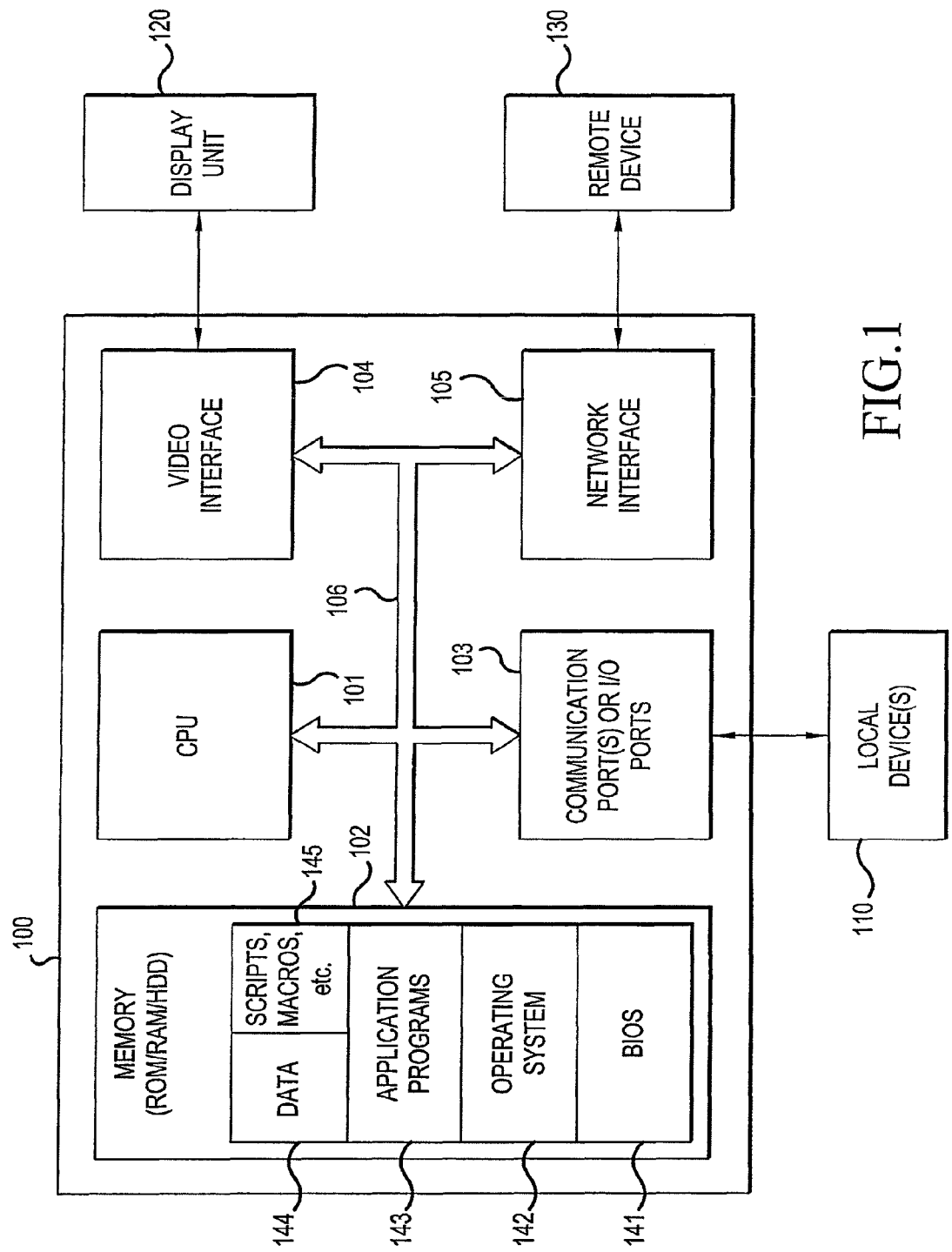
FIG. 1 illustrates the basic architecture of a computing device that can operate as either a client device, a server, or a server-side device according to exemplary embodiments of the present invention.

FIG. 1 illustrates a generalized computing device 100 that can be used as an environment for implementing various aspects of the present invention. For instance, the computing device 100 may be implemented as a client device, i.e., a user's computing device on which a web browser is installed to request webpages or resources from the server. Examples of such client devices include a mobile device (e.g., a cellphone, a smartphone, a tablet computer, etc.) or a general purpose desktop computer such as a PC. However, the computing device 100 of FIG. 1 may also be implemented as a server-side device, e.g., as a web server, a proxy server, or another specialized computing device as will be describe in more detail below.

In FIG. 1, a computing device 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memories, stores the various software components of the system. The software components in the memory 102 may include a basic input/output system (BIOS) 141, an operating system 142, various computer programs 143 including applications and device drivers, various types of data 144, and other executable files or instructions such as macros and scripts 145. For instance, the computer programs 143 stored within the memory 102 may include any number of applications, including a web browser and other web applications that may be executed in accordance with principles of the present invention.

In FIG. 1, the communication ports 103 may be connected to one or more local devices 110 such as user input devices, a printer, a media player, external memory devices, and special purpose devices such as, e.g., a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120 which may be an external monitor or an integrated display such as an LCD display. The display unit 120 may have a touch sensitive screen and in that case the display unit 120 doubles as a user input device. The user input device aspects of the display unit 120 may be considered as one of the local devices 110 communicating over a communication port 103.

The network interface device 105 provides the device 100 with the ability to connect to a network in order to communicate with a remote device 130. Such network, which in FIG. 1 is only illustrated as the line connecting the network interface 105 with the remote device 130, may be, e.g., a local area network or the Internet. The remote device 130 may in principle be any computing device (e.g., client or server) with similar communications capabilities as the device 100.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present.

In an exemplary embodiment, various aspects of the present invention may be incorporated into, or used in connection with, the components and/or functionality making up a web browser installed as an application on a device 100. While the terms "web browser" and "browser" are used throughout this specification, it should be understood that such terms are not intended to limit the present application only to traditional web browser programs, but instead cover any type of user agent or web application that is capable of sending URL requests for data resources (including, but not limited to, webpages) over the World Wide Web consistent with the principles of the present invention.

Figure 2:
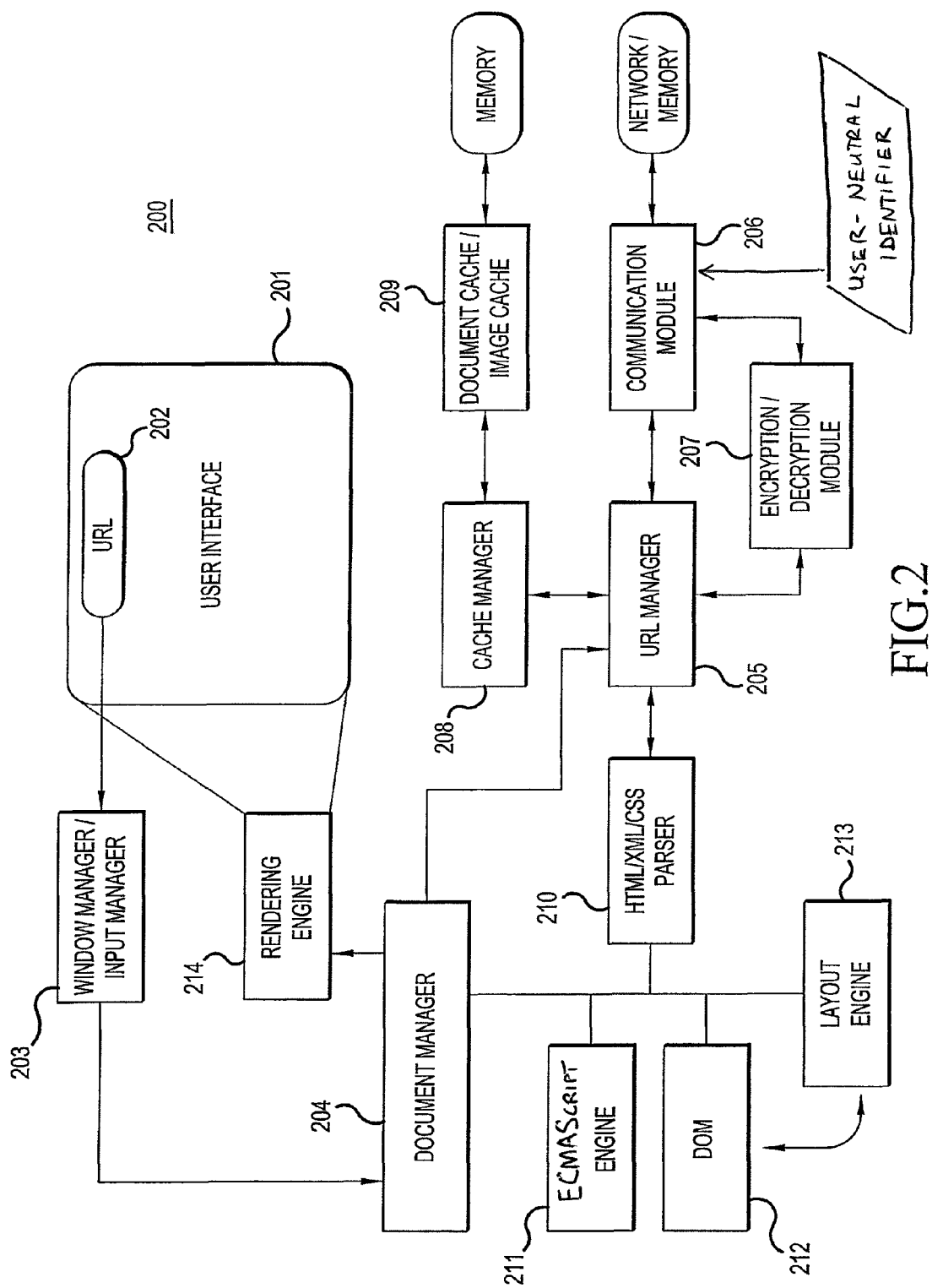
FIG. 2 illustrates the basic architecture of a web browser implemented on a client device according to an exemplary embodiment of the present invention.

FIG. 2 illustrates the basic architecture of a web browser 200 that can be used in connection with the present invention. Particularly, FIG. 2 shows an example of various modules that may be present in such a web browser 200. The modules will typically be software modules, or otherwise implemented by a programmer in software, and may be executed by the CPU 101. However, it is also possible for any of the modules of FIG. 2 to be implemented as hardware, a combination of hardware and software, or "firmware," as will be contemplated by those skilled in the art.

The web browser 200 presents the user with a user interface 201 that may be displayed on the display unit 120 shown in FIG. 1. The user interface 201 may include an address field 202 in which the user may input or select the URL of a document or a service he or she wants the browser 200 to retrieve. For example, the user may use an input device (e.g., keyboard) to type in the URL in the address field 202. The address field 202 may also be a link that is displayed and may be activated by the user using a pointing device such as a mouse. Alternatively the URL may be specified in the code of a document or script already loaded by the web browser 200.

In any case, the URL may be received by a window and input manager 203 that represents the input part of the user interface 201 associated with, or part of, the browser 200. The URL may then be forwarded to a document manager 204, which manages the data received as part of the document identified by the URL.

The document manager 204 forwards the URL to a URL manager 205, which instructs a communication module 206 to generate a webpage request, i.e., a request for access to the identified resource. The communication module 206 may be capable of accessing and retrieving data from a remote device 130 such as a server over a network using the hypertext transfer protocol (HTTP), or some other protocol such as HTTP Secure (HTTPS) or file transfer protocol (FTP). The communication module 206 may also be capable of accessing data that is stored in the local memory 102 of the computing device 100.

According to an exemplary embodiment of the present invention, the communication module 206 is programmed to include within each webpage request other types of information in addition to the requested URL. As shown in FIG. 2, for instance, a user-neutral identifier is provided to the communication module 206 to be inserted into the webpage requests. Preferably, each webpage request that is generated by communication module 206 includes the same user-neutral identifier, which is designed to uniquely identify the web browser 200 from other browsers 200 installed on other devices 100. As mentioned earlier, this user-neutral identifier may be programmed somewhere within the web browser 200 before such browser 200 is installed on the computing device 100. Alternatively, the browser 200 may be programmed to generate the user-neutral identifier upon installation, and register it with a server-side facility (which will be described in more detail below in reference to FIG. 3) or another central location to ensure its uniqueness with regard to the registered user-neutral identifiers corresponding to other browsers 200. It is also possible to have a server-side facility (or other remote location) generate the user-neutral identifier and transmit it to the browser 200 when an initiation process is performed or when the browser 200 is first used. Furthermore, it is possible for a user-neutral identifier to be regenerated for replacing the previous one in the browser 200; this could occur periodically or when the browser 200 is updated to a new version.

Further, communication module 206 may also insert other data elements into each webpage request, in addition to the requested URL and user-neutral identifier. These additional data elements may include one or more of the following: type of computing device 100 (e.g., make and model number or a more generic description); date and time of the request; identity of a network service provider that services the computing device 100. The insertion of such additional data elements can increase the amount of data that can be collected by a server-side facility without requiring such facility to intrude or impact the performance of the browser 200 and corresponding device 100. It is also possible to configure the communication module 206 to insert parameters that are to be used by a server-side facility to filter the results that are returned to the browser 200 in response to the webpage request.

Referring again to FIG. 2, the web browser 200 may include an encryption/decryption module 207 to handle communication between the URL manager 205 and the communication module 206, if communication outside the computing device 100 is required to be encrypted (e.g., as specified by the protocol used for accessing the URL).

The data received by the communication unit 206 in response to a webpage request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a remote device 130 when the same URL is requested a second time.

The URL manager 205 forwards the data received from the communication port 206 or cache 209 to a parser 210 capable of parsing content such as HTML, XML and CSS. The parsed content may then, depending on the type and nature of the content, be processed further by an ECMAScript engine 211, a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL. When the data representing the content of the specified document has been processed it is forwarded from the document manager 204 in order to be rendered by a rendering engine 214 and displayed on the user interface 201.

The various modules thus described are executed by the CPU 101 of computing device 100 as the CPU 101 receives instructions and data over the system bus(es) 106. The communications module 206 communicates with the remote device 130 using the network interface 105. The functionality of various modules in FIG. 2 may of course be integrated into fewer larger modules. Also, the functionality of a single module in FIG. 2 may be distributed or replicated over several modules.

It will further be understood that, while the web browser 200 described above may be implemented as an application program 143 of the computing device 100, some of the browser's 200 functionality may also be implemented as part of the operating system 142 or even the BIOS 141 of the device 100. Further, the content received in response to a webpage request may include data 144, script 145, or a combination thereof.

Figure 3:
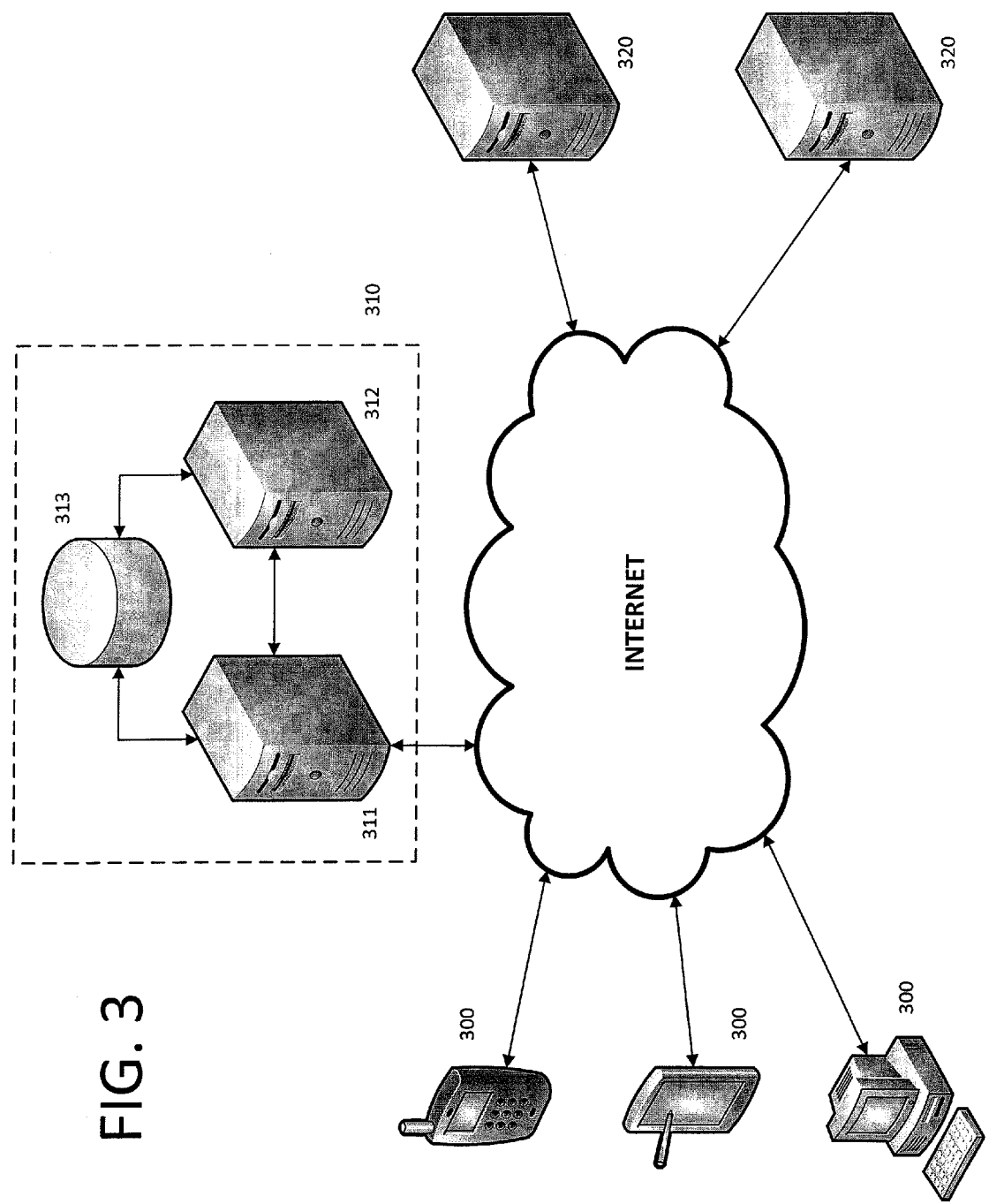
FIG. 3 illustrates a system for implementing principles of the present invention according to an exemplary embodiment.

Reference is now made to FIG. 3, which shows a system in which principles of the present invention may be implemented, according to exemplary embodiments. As shown in FIG. 3, a number of client devices 300 are connected to the Internet. As shown in the figure, such client devices 300 may include mobile devices, such as a phone or tablet computer or a general purpose desktop computer (e.g., PC). Each client device 300 has a web browser 200 installed therein for requesting and retrieving webpages and other resources over the World Wide Web. Also, in FIG. 3, elements 320 represent web servers which host websites from which webpages and other resources may be requested and retrieved via the Internet. For purposes of simplicity, only two web servers 320 are shown. However, it will be readily understood that there is no limitation as to the number or types of web servers 320 that can be visited and recorded in accordance with the principles of the present invention.

In addition, FIG. 3 illustrates a server-side facility 310 which includes a proxy server 311, a profile manager device 312, and a database 313. The proxy server 311 and profile manager device 312 may generally correspond to the basic architecture of a computing device 100 described above in connection with FIG. 1. Further, although the proxy server 311, profile manager device 312, and database 313 are illustrated as separate elements, the functionality of any two or of all three of these elements as described hereinbelow may be combined into a single device without departing from the scope and spirit of the present invention. Alternatively, the functionality of any one of these elements in the server-side facility 310 may be distributed across multiple devices. Furthermore, while the proxy server 311, profile manager device 312, and database 313 are described and illustrated as being implemented in a server-side facility 310, this is not intended to impart any requirement as to physical proximity between such elements. For instance, it is possible for the proxy server 311 and profile manager device 312 to be maintained in different locations and communicatively connected, e.g., via wide area network (WAN) or even the Internet.

One of the functions of the server-side facility 310 may be to register user-neutral identifiers that are embedded in the web browsers 200 installed on the respective client devices 300. For instance, the user-neutral identifiers may be programmed in the browsers 200 and transmitted to the proxy server 311 as part of a registering process that occurs, e.g., upon first use of each browser 200. Alternatively, it is possible for the proxy server 311 (or profile manager device 312, or another computing device at the server-side facility 310) to generate the user-neutral identifiers and transmit them to the respective browsers 200 after they are registered. For instance, the user-neutral identifier may be transmitted to a browser 200 during an initiation or updating of the browser 200. One of the purposes of registering the user-neutral identifier is for the server-side facility 310 to ensure its uniqueness with regard to the other registered user-neutral identifiers. Other purposes may be served as well by the registration process, e.g., to ensure that each user-neutral identifier conforms to a certain format (e.g., a numerical or alpha-numerical string of a certain length) and/or does not provide any user-specific information that could hinder user anonymity.

Other possible functions of the server-side facility 310, and particularly those of the proxy server 311, will now be discussed. According to an exemplary embodiment, the proxy server 311 may receive and process web browsing requests from a client device 300, as well as facilitate webpage delivery from the corresponding web server 320. It is also possible for such proxy server 311 to operate as a transcoding server (or else operate in conjunction with a transcoding server) which modifies the code of the retrieved webpages to make them more suitable to the processing and/or display capabilities of the requesting client device 300. Such transcoding functionality may be especially useful for mobile client devices 300 which have small displays and limited processing capability. Furthermore, the proxy server 311 could be programmed to modify and/or filter the data of the retrieved webpages before it is forwarded to the client device 300, e.g., according to the user's preferences or browsing habits. This could be accomplished by configuring the proxy server 311 to analyze a user profile or receive explicit instructions or settings from a user. As an example, the user could tell the proxy server 311 to filter out any cookies from the retrieved webpage. In this way, the proxy server 311 can provide an additional means by which a user can exert control over what data is received in the electronic device.

Figure 4:
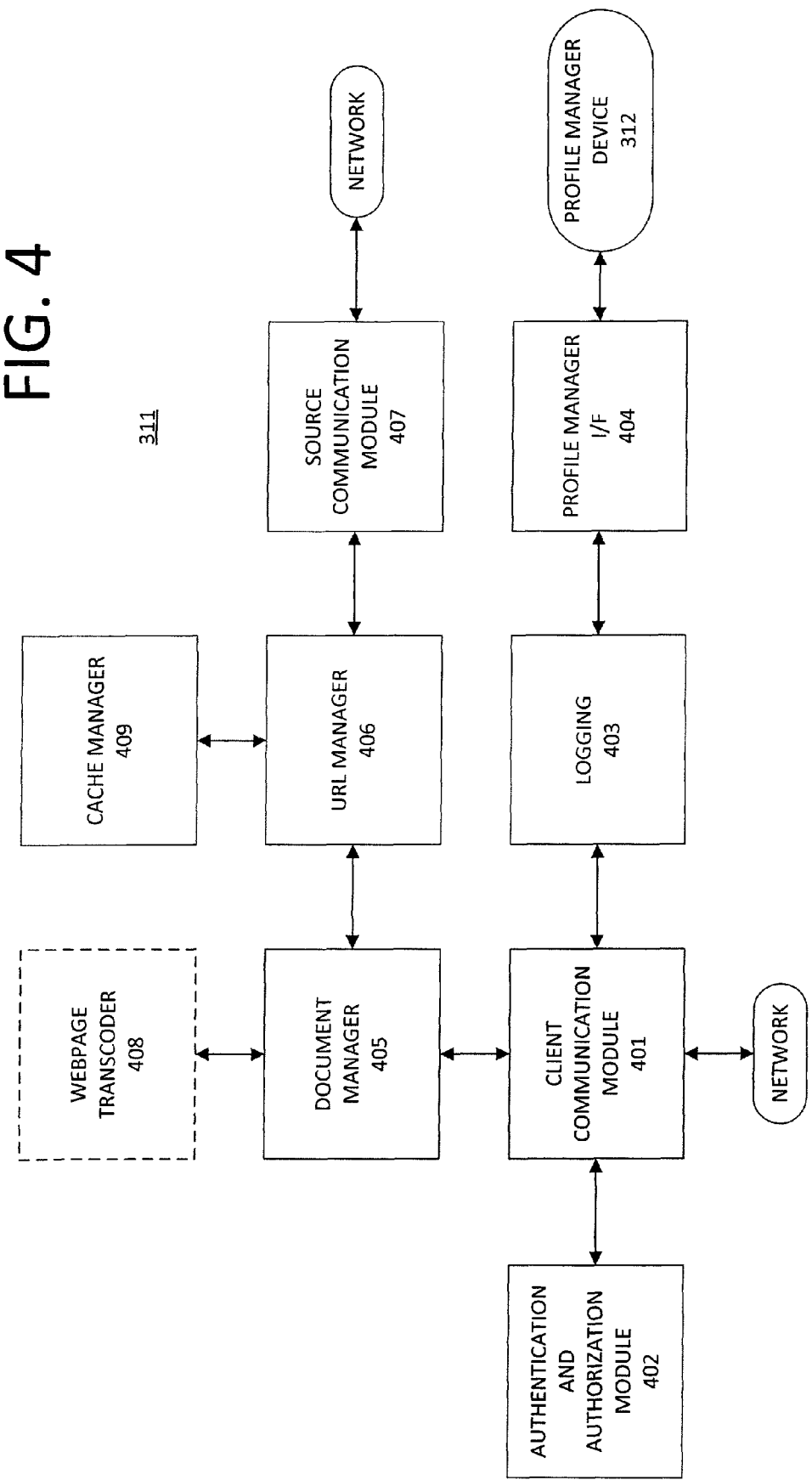
FIG. 4 illustrates software modules of a proxy server according to an exemplary embodiment of the present invention.

Reference is now made to FIG. 4, which illustrates how the proxy server 311 may be organized in terms of software modules installed on a computing device, according to an exemplary embodiment of the present invention. Among the modules of FIG. 4 is a client communication module 401 for receiving webpage requests (and other data) from client devices 300. The client communication module 401 may be configured to receive HTTP or HTTPS requests over TCP/IP, but consistent with the principles of the invention, the communication device 401 may also communicate using other standards or protocols and other types of networks than the Internet. By way of example, the client communication module 401 may be configured to communicate, directly or indirectly, over a mobile telephone network such as GSM, UMTS, CDMA or over wireless networks such as Wi-Fi Wireless LAN (IEEE 802.11) or WiMAX (IEEE 802.16).

The client communication module 401 may be connected to an authentication and authorization module 402, which determines whether a requesting client device 300 needs to be authenticated (and performs such authentication if necessary) and/or whether the client device 300 is authorized to access requested webpages using the proxy server 312. Authentication and/or authorization can be handled by methods that are well known by those skilled in the art. One example of such methods is username/password combinations.

In FIG. 4, a logging module 403 is provided for generating a record of each webpage request received from a client device 300. According to an exemplary embodiment, this logging module 403 extracts the user-neutral identifier and the requested URL from the webpage request. In addition, the logging module 403 may (optionally) extract other data elements which were inserted into the request by the corresponding web browser 200, examples of which include: type of client device 300 (e.g., make and model number), date and time the request was transmitted, and network service provider for the client device 300. The user-neutral identifier, URL, and any other extracted data elements are recorded (e.g., in a log file) by the logging module thereby creating a record of the webpage request. Each record may be stored in local memory 102 (FIG. 1) of the proxy server 311 until such time that it will be used to create or update a profile for the corresponding user-neutral identifier. At such time, the records may be transmitted via profile manager interface 404 to the profile manager device 312 illustrated in FIG. 3. This profile manager interface 404 may be configured to communicate with the profile manager device 312 directly via cable or through a network such as a local area network (LAN), a WAN, or the Internet.

While FIG. 4 illustrates the profile manager interface 404 as communicating with an external profile manager device 312, this may not always be the case. For instance, in an alternative embodiment, the functionality of the profile manager device 312 may be implemented as additional within the proxy server 311.

Referring again to FIG. 4, the client communication module 401 may forward the URL of each webpage request to the document manager 405, much in the same way that the window and input manager 203 of a web browser 200 forwards a URL to the document manager 204 (as discussed above with reference to FIG. 2). The document manager 405 of FIG. 4 may forward the URL to a URL manager 406, which then instructs a source communication module 407 to request access to the identified resource. The source communication module 407 may be capable of accessing and retrieving data from a web server 320 over the Internet using the hypertext transfer protocol (HTTP) or some other protocol such as HTTPS or FTP. The source communication module 407 may also be capable of accessing data that is stored in local memory 102. If the networks, communication standards, and protocols used by the client communication module 401 and the source communication module 407 are the same, these two modules may be implemented as a single communication module handling all communications to and from the proxy server 311.

In response to the request sent by the source communication module 407, webpage data may be received in the form of one or more files. The received data may then be forwarded to the URL manager 406.

In an exemplary embodiment, the URL manager 406 may then store a copy of the received webpage in local memory 102 using the cache manager 409. According to this embodiment, if the same URL is requested at a later time (even from a different client device 300), the URL manager 406 could request it from the cache manager 409. This corresponds to the caching performed by a local web browser installed on a client device 300, as described above with reference to FIG. 2, and also to methods performed by proxy servers, as will be readily apparent to those of ordinary skill in the art.

Referring again to FIG. 4, the URL manager 406 may forward the received webpage data to the document manager 405 for further processing. This may include, e.g., extracting any cookies from the webpage and automatically deleting them or possibly storing them in local memory 102 for future reference. Also, it is possible that the proxy server 311 could query the profile corresponding to the client device 300 (based on the extracted user-neutral identifier) and/or analyze extracted cookies for use in modifying the webpage based on the user's interests. For example, certain types of advertising could be injected into or deleted from the webpage before it is forwarded to the client device 300. Another option is to program the document manager 406 to filter or modify the webpage data according to parameters/settings included in the original webpage request. This would allow the user of the client device 300 to exert some control over what types of data is returned to the client device 300. The document manager may also be configured to filter content according to applicable law, manage 404 responses, etc.

According to a specific example, the document manager 405 may under certain circumstances send the received webpage data to a webpage transcoder 408. This webpage transcoder 408 is optionally included, as indicated by the dotted lines in FIG. 4, if the proxy server 311 is intended to function as a transcoding server as well. As such, the webpage transcoder 408 can be used to convert the content and/or format of the webpage in accordance with the processing and/or display capabilities of a particular type of client device 300. For instance, if the client device 300 is a mobile device, its display will typically be smaller and have a different aspect ratio than its counterpart desktop computers (e.g., PC's) for which most webpages are designed. Also, certain mobile devices (e.g., phones) may not include the full functionality of their desktop counterparts. As such, the webpage transcoder 407 may be programed to re-encode the webpage to make it more suitable to the display and/or processing capabilities of a mobile client device 300 that requested the webpage.

It should be noted that, while the webpage transcoder 408 is illustrated as an internal module of the proxy server 311, its functionality may alternatively be embodied in an external transcoding server that is communicatively connected to the proxy server 311.

Referring again to FIG. 4, after the retrieved webpage is processed (and possibly transcoded), it can be forwarded from the document manager 405 to the client communication module 401 for transmission to the particular client device 300 which requested it.

Figure 5:
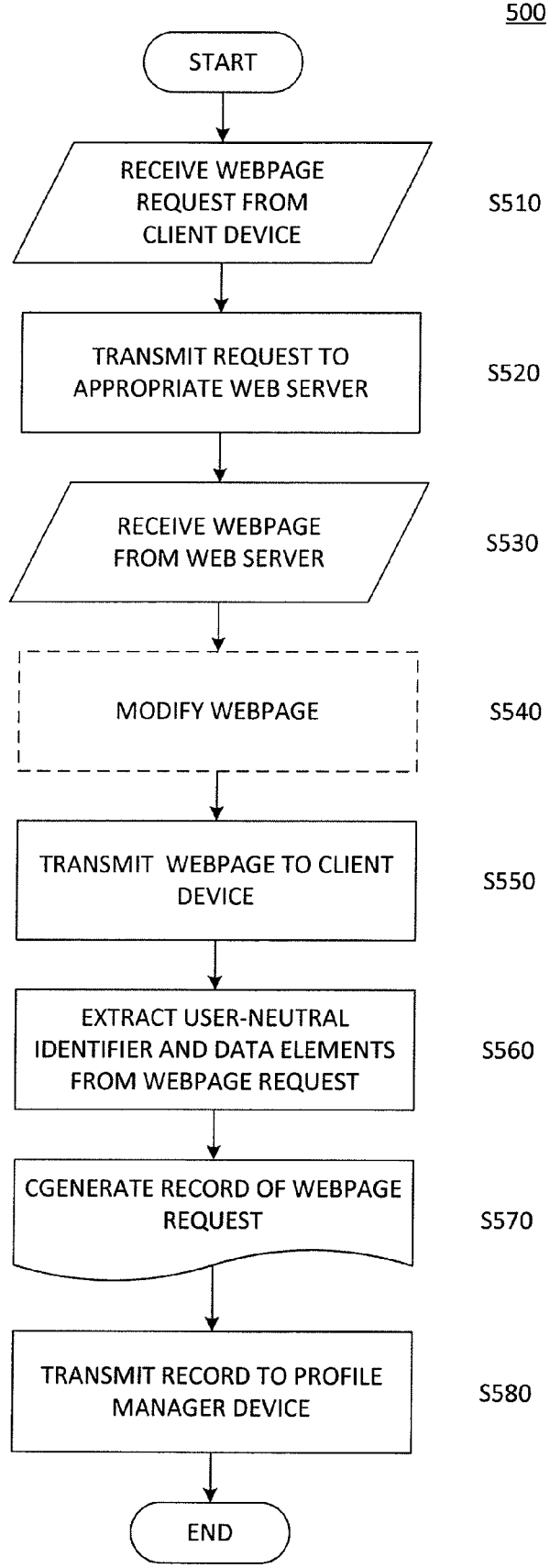
FIG. 5 is a flow chart illustrating a process performed by a proxy server according to an exemplary embodiment of the present invention.

Reference will now be made to FIG. 5, which is a flow chart illustrating a process 500 that may be performed by the proxy server 311 according to an exemplary embodiment of the present invention. It should be noted that this figure is provided for purpose of example only, and is not to be construed as limiting the present invention. For example, the sequence of operations illustrated in FIG. 5 may be altered, and some of the illustrated operations may be omitted or performed by other devices.

As shown in FIG. 5, process 500 may be initiated when the proxy server 311 receives a webpage request transmitted by a web browser 200 installed in a client device 300, as shown in S510. On the basis of the URL in the received request, the proxy server 311 may request the corresponding webpage from the appropriate web server 320, as shown in S520. However, if the proxy server 311 maintains cached versions of previously retrieved webpages, it may first check its own cache in order to determine whether or not it is necessary to request the webpage from the web server 320. If an up-to-date version of the requested webpage is already in the proxy server's 311 cache, operation S520 can be skipped.

In FIG. 5, the proxy server 311 receives the requested webpage from the web server 320 (or possibly its own cache) in S530. The proxy server 311 may then modify the webpage according to S540. For instance, such modification may include transcoding the webpage (as described above in connection with the webpage transcoder 408 of FIG. 4). In performing such transcoding, the proxy server 311 may be able to ascertain the type of client device 300 from a data element within the webpage request.

In addition (or alternative) to such transcoding, operation S540 may also be used to modify the webpage in accordance with the interests or browsing habits of the requesting user. For example, the proxy server 311 could analyze the profile corresponding to the user's web browser 200 by querying the database 313 based on the user-neutral identifier that is included in the webpage request. By analyzing the profile, the proxy server 311 may be able to choose from among various types of advertisements, and select those which match the user's interests (as determined by the types of websites he/she frequently visits) and possibly other pertinent information (e.g., the type of client device 300 he/she uses). Such advertisements may then be inserted within the retrieved webpage prior to transmission to the client device 300. In addition to advertisements, S540 could be used to modify the webpage in a similar manner as cookies are traditionally used. In fact, it would be possible for the proxy server 311 to analyze a cookie extracted from the webpage, as well as previously extracted cookies that have been stored in connection with the same user-neutral identifier, and modify the webpage according to such analysis.

Furthermore, in S540, the proxy server 311 could also modify the requested webpage in order to remove certain types of intrusive code intended to be stored to the client device 300, e.g., cookies. Other types of modifications are possible as well. For instance, operation S540 could be used to enhance search results that are provided by a search provider, e.g., by highlighting words in the search results that match the user's search query.

It should be noted, as indicated by the dotted lines for S540 in FIG. 5, it is optional for the proxy server 311 to modify the retrieved webpage before transmitting it to the browser 200 of the requesting client device 300 according to S550.

In addition to retrieving (and possibly modifying) the webpage for the client device 300, the proxy server 311 may also be configured to generate a record of the webpage request and forward this record to the profile manager device 312. Such functionality is illustrated by operations S560-S580 of FIG. 5. Although FIG. 5 illustrates these steps as being performed after the webpage has been retrieved (and possibly modified), this does not have to be the case. For example, any or all of operations S560-S580 could be performed by the proxy server 311 prior to the webpage being retrieved from the appropriate web server 320.

According to S560, the proxy server 311 extracts the user-neutral identifier, the requested URL (if not already extracted), and possibly other data elements from the webpage request. The extracted data is used to generate a record of the webpage request in S570. E.g., the proxy server 311 may create a log file including the user-neutral identifier and URL, along with any other data elements that might be extracted from the webpage request. As described earlier, the webpage request may additionally include any of the following data elements: specific type of client device 300 making the request, date and time the request was transmitted, the network service provider of the client device 300, and/or any other information that is deemed pertinent. Such data elements may be extracted in S560 for inclusion in the record.

As shown in S570 of FIG. 5, a record (e.g., log file) is generated which includes the data extracted as a result of S560. However, the proxy server 311 may include additional data in this record, which was not obtained from the webpage request. For example, the proxy server 311 may be able to gather its own information to be inserted in the record, such as the amount of data consumed by the retrieved webpage. E.g., an interface with the mobile service provider may be able to provide the proxy server 311 with location data of the client device 300, and this may be inserted into the record. Also, it is possible to include in the record third party information that is obtained, e.g., from the visited website.

Sometime after the record is generated in S570, the record is transmitted from the proxy server 311 to the profile manager device 312 according to S580. It should be noted that, in S580, the proxy server 311 may transmit each record to the profile manager device 312 as soon as the record is created (or shortly thereafter). Conversely, the proxy server 311 may be programmed to transmit records to the profile manager device 312 as a batch. These batch transmissions could occur either periodically or at prescribed times, or in response to a precondition (e.g., after a threshold number of requests have been received).

Next, a description will be provided of the profile manager device 312. The profile manager device 312 may be implemented in any computing device 100, such as a server or standard desktop computer. As described above, it is even possible that the profile manager device 312 may be incorporated in the same device as the proxy server 311.

To describe the operations and functionality of the profile manager device 312, reference will be made to FIG. 6. Particularly, FIG. 6 is a flow chart illustrating a process 600 performed by the profile manager device 312 according to an exemplary embodiment of the present invention. It should be noted that FIG. 6 is offered for purposes of example only, and is not intended to be limiting on the profile manager device 312. For instance, the various operations illustrated in this FIG. 6 could be performed in a different sequence than shown. Also, it is possible that one or more of these operations to be omitted based on design considerations.

Particularly, the process 600 of FIG. 6 may be initiated when the profile manager device 312 receives one or more generated records from the proxy server 311, in accordance with S610. When the record is received, the profile manager device 312 may proceed to categorize the requested URL and possibly other data elements in the record within defined categories as shown in S620.

According to an exemplary embodiment, S620 is performed in order to categorize one or more data elements of the record (including the requested URL) within defined categories. It is specifically contemplated that the URL in the record can be categorized into at least one category that corresponds to a particular activity or interest of the user. For example, if the URL corresponds to the website for a particular newspaper or television news network, the URL may be categorized as "news." On the other hand, if the URL providing reviews of rock bands, it may be categorized as "rock and roll" or more generically as "music." It is also possible for the URL to be categorized into multiple defined categories. For example, the URL of a website which sells books could be categorized as both "books" and "shopping." After the URL is categorized according to S620, only the URL category(-ies) may be retained in the corresponding profile and the actual URL may be omitted. By not retaining the requested website in the profile, this can eliminate concerns that the browsing activity of the user or client device 300 is being "followed" from website to website.

It should be noted, however, that it is not strictly necessary to categorize the URL in S620 before including it in the profile. For instance, in an alternative embodiment, it may be possible to maintain within the profile a list or history of the actual URL's requested.

Furthermore, it is also possible for other data elements in the record to be categorized according to S620. As an example, if a data element for the type (e.g., make/model) of client device 300 is included, such data element could be categorized within a defined category such as "mobile" or "desktop." In another example, a data element corresponding to time of request could be categorized within one of the following categories: "morning," "afternoon," or "evening."

Referring again to FIG. 6, in S630, the profile manager device 312 checks whether or not a profile corresponding to the user-neutral identifier in the record has already been created in the database 313. If such profile already exists, it is retrieved from the database 313 according to S640, and modified according to the data obtained from the record. On the other hand, if the database 313 does not contain such a profile, the profile manager device 312 generates a new profile to be linked to the user-neutral identifier in S650. This new profile, however, should not be linked to any information that is personally identifiable to the user of the client device 300 that transmitted the webpage request.

According to an exemplary embodiment, when creating or updating the profile according to S650 or S660, the profile manager device 312 aggregates data obtained from the record within defined categories of the profile, in accordance with the categorizing operation of S620. This could be used to provide a "frequency-of-use" profile or histogram of the URL's visited by the same user. Accordingly, the profile may include a plurality of defined categories of websites that could be visited, and each category may be associated with a counter representing the number of visits. As an example, when a requested URL is categorized within the "sports" category in S620, the counter that is associated with the "sports" category within the profile is incremented by one. Accordingly, the profile could be used to compare the number of times the user visited a sports-related websites versus other types of websites, e.g., news, shopping, and gaming-related sites. Another way of determining a user's preferences or habits would be to compare the user's histogram values to the entire base of user profiles. For instance, if the user has registered a number of visits for sports-related websites, which exceeds the average (or median) number of visits of all profiled users by a particular threshold, the profile manager device 312 could use this information to designate "sports" as being one of the particular interests of that user. Of course, other comparative analyses may be used to determine a user's preferences or habits based on the entire base of user profiles.

In addition to categorizing data elements, however, operations S650 and S660 may also analyze and derive certain metrics from various data elements within the record, and incorporate such metrics within the profile. These metrics may be derived based on any methodology for querying a data set. For instance, a metric can be derived from a single data element, e.g., deriving the country or geographic location of the client device 300 based on the service provider's identity. However, metrics can also be derived from combinations of data elements obtained from the record. Examples of such metrics include number of webpages viewed per day, amount of data consumed per webpage view, etc. It is contemplated that more complex mathematical or statistical analyses may be applied to derive such metrics.

Furthermore, the aggregated categories and derived metrics for each profile may take the form of data elements that can be queried in combinations and permutations of the basic dataset of the database 313 using existing relational database methodologies. As such, the database 313 may be set up as a relational database, and an interface may be established to receive and respond to queries. Furthermore, such queries may be used to access data from a single profile (based on user-neutral identifier), or analyze the dataset across multiple profiles within the database 313. For example, the proxy server 311 may want to query the database 313 with regard to a single profile corresponding to the requesting browser 200, for the purpose of personalizing the retrieved webpage before forwarding it to the client device 300. On the other hand, a particular web server 320 (or other entities like advertisers, etc.) may want to query the dataset spanning multiple profiles to obtain various types of market intelligence. For example, the database 313 could be queried to obtain intelligence regarding the following types of traffic on the Internet: traffic to and from a particular website or webpage, traffic originating from a specific type of client device 300 or geographic location, traffic carried by a particular network or service provider. Of course, other types of intelligence regarding Internet traffic can be obtained by querying the database 313 consistent with principles of the present invention.

Referring again to FIG. 6, after the profile has been generated or updated in accordance with the received record, the profile may then be stored in the database 313 (in correspondence with the appropriate user-neutral identifier) as shown in S670.

Next, reference will be made to FIG. 7. Particularly, FIG. 7 is a data flow diagram illustrating interactions between a client device 300, a server-side facility 310, and a web server 320 according to an exemplary embodiment of the present invention. In the following description of FIG. 7, parenthetical references are used to link various data flows with corresponding operations illustrated in FIGS. 5 and 6.

It should be noted that FIG. 7 is provided for purposes of example, and is not intended to be limiting on the invention. For instance, the sequence of data flows in this figure may be changed, and certain data flows may even be omitted.

As shown in FIG. 7, the web browser 200 of a client device 300 transmits a webpage request including at least the user-neutral identifier of that browser 200 and the requested URL, as illustrated by data flow 701. This webpage request is received by the proxy server 311 (S510 of FIG. 5). In order to retrieve the requested webpage for the client device 300, the webpage request may be transmitted from the proxy server 311 to the appropriate web server 320 as shown in data flow 702 (S520 of FIG. 5). In response, the proxy server 311 receives the corresponding webpage from the web server 320 according to data flow 703 (S530 of FIG. 5). As described earlier, however, it is possible that data flows 702 and 703 may be omitted in case the proxy server already has a cached copy of the webpage corresponding to the received URL. Thereafter, the requested webpage may be transmitted from the proxy server 311 to the client device 300 according to data flow 704 (S550 of FIG. 5), possibly after the proxy server 311 has modified or transcoded the webpage. After receiving the webpage, the web browser 200 on the client device 300 is able to display or render the webpage.

Furthermore, as described above in connection with S570 of FIG. 5, the proxy server 311 may generate a record of the webpage request that includes at least the user-neutral identifier and the URL that were provided in such request. As shown in FIG. 7, such record may be transmitted from the proxy server 311 to the profile manager device 312 according to data flow 705 (S580 of FIG. 5; S610 of FIG. 6). As mentioned above, such record may be transmitted singularly by the proxy server 311, or as part of a batch of records periodically transmitted.

As shown in FIG. 7, upon receiving the record, the profile manager device 312 may query the database 313 for the corresponding profile based on the user-neutral identifier, as illustrated in data flow 706 (S630 of FIG. 6). If such profile already exists, it is retrieved by the profile manager device 312 from the database 313 according to data flow 707 (S640 of FIG. 6). After updating the profile (or creating it if necessary), the profile is stored in the database 313 according to data flow 708 (S670 of FIG. 6). At this point, the information in the updated (or new) profile can be added to the dataset of other profiles in the database 313, e.g., to be queried according to relational database methodologies. As mentioned earlier, an interface (not shown) to the database 313 may be provided to facilitate such queries. As shown in FIG. 7, for example, the proxy server 311 may query a particular profile in the database 313 as represented by data flows 711 and 712, in order to personalize a retrieved webpage according to the habits or interests of a requesting user. On the other hand, a particular web server 320 (or other parties, e.g., advertisers) may also query the database 313, as shown in data flows 721 and 722, to obtain market intelligence that can be used to tailor content or advertising to an anticipated audience.

While particular embodiments are described above for purposes of example, the present invention covers any and all obvious variations as would be readily contemplated by those skilled in the art.

The invention claimed is:

1. A method comprising:
registering by a server, user-neutral identifiers for a plurality of web browsers installed on respective electronic devices, each user-neutral identifier comprising a different character string that is first provided to a corresponding one of the plurality of web browsers as a result of one of:
being programmed into the corresponding web browser prior to installation on the respective electronic device,
being created by the corresponding web browser upon installation on the respective electronic device, and
being transmitted by the server to the corresponding web browser;
receiving at the server, webpage requests transmitted by the plurality of web browsers via a network, each of said webpage requests including a URL and the user-neutral identifier of the corresponding web browser;
extracting by said server, the user-neutral identifiers from each of said webpage requests;
creating by said server, records of said webpage requests including said extracted user-neutral identifiers;
using the extracted user-neutral identifier of each webpage request to match the corresponding record to one of a plurality of profiles already created for respective user-neutral identifiers; and
processing each of the records to:
create a new profile for the user-neutral identifier in the record if no match exists in the plurality of profiles already created, or
update the one of the plurality of profiles already created, which matches the user-neutral identifier of the record,
wherein each user-neutral identifier is registered prior to insertion into any user-initiated webpage request transmitted by the corresponding web browser, and
wherein the user-neutral identifiers are registered in such manner as to ensure that they uniquely identify the web browser issuing each of said webpage requests from others of said plurality of web browsers, and maintain user anonymity by associating no user-specific information with any of the user-neutral identifiers.

2. The method of claim 1, wherein said server is a proxy server, said method further comprising:
retrieving by said proxy server, in response to at least one of said webpage requests, a webpage from another server on said network corresponding to the URL in said webpage request; and
transmitting by said proxy server, the retrieved webpage to the web browser issuing said webpage request.

3. The method of claim 1, further comprising:
categorizing one or more data elements in each of said records; and
aggregating the categorized data elements from each of said records within defined categories of the profile corresponding to the same user-neutral identifier.

4. The method of claim 3, wherein said one or more data elements include the URL of the corresponding webpage request.

5. The method of claim 4, wherein said one or more data elements include at least one of the following:
type of electronic device, when the corresponding webpage request was transmitted, and identity of service provider.

6. The method of claim 4, further comprising:

analyzing data elements in said records to derive metrics for said profiles;

storing information from said profiles as a dataset within a relational database; and providing an interface for said relational database for querying said dataset according to any or a combination of said defined categories and/or said metrics.

7. A system comprising:

a server including at least one processing device programmed to:

register user-neutral identifiers for a plurality of web browsers installed on respective electronic devices, each user-neutral identifier comprising a different character string that is first provided to a corresponding one of the plurality of web browsers as a result of one of:

being programmed into the corresponding web browser prior to installation on the respective electronic device;

being created by the corresponding web browser upon installation on the respective electronic device; and being transmitted by the server to the corresponding web browser, receive webpage requests transmitted by the plurality of web browsers via a network, each of said webpage requests including a URL and the user-neutral identifier of the corresponding web browser, extract the user-neutral identifiers from each of said webpage requests, and create records of said webpage requests including said extracted user-neutral identifiers, use the extracted user-neutral identifier of each webpage request to match the corresponding record to one of a plurality of profiles already created for respective user-neutral identifiers, and process each of the records to create a new profile for the user-neutral identifier in the record if no match exists in the plurality of profiles already created, or update the one of the plurality of profiles already created, which matches the user-neutral identifier of the record; and a database storing the profiles corresponding to the user-neutral identifiers, each created or updated according to the processing of the record that corresponds to the same user-neutral identifier, wherein each user-neutral identifier is registered prior to insertion into any user-initiated webpage request transmitted by the corresponding web browser, and wherein said user-neutral identifiers are registered in such manner as to ensure that they uniquely identify the web browser issuing each of said webpage requests from others of said plurality of web browsers, and maintain user anonymity by associating no user-specific information with any of the user-neutral identifiers.

8. The system of claim 7, wherein said server is a proxy server is further programmed to:

retrieve, in response to at least one of said webpage requests, a webpage from another server on said network corresponding to the URL in said webpage request; and transmit the retrieved webpage to the web browser issuing said webpage request.

9. The system of claim 7, wherein said server is further programmed to:

categorize one or more data elements in each of said records; and aggregate the categorized data elements from each of said records within defined categories of the profile corresponding to the same user-neutral identifier.

10. The system of claim 7, further comprising a computing device communicatively connected to receive said records from said server, said computing device including a processing device programmed to:

categorize one or more data elements in each of said records; and aggregate the categorized data elements from each of said records within defined categories of the profile corresponding to the same user-neutral identifier.

11. The system of claim 10, wherein said one or more data elements include the URL of the corresponding webpage request.

12. The system of claim 11, wherein said one or more data elements further includes at least one of the following:

type of electronic device, when the corresponding webpage request was transmitted, and identity of service provider.

13. The system of claim 10, wherein said processing device of said computing device is further programmed to analyze data elements in said records to derive metrics for said profile, and said database is configured as a relational database, and includes an interface for querying information from said profiles according to any or a combination of said defined categories and/or said metrics.

14. A non-transitory computer-readable medium on which are stored instructions executable by a processor to perform a process comprising:

registering by a server, user-neutral identifiers for a plurality of web browsers installed on respective electronic devices, each user-neutral identifier comprising a different character string that is first provided to a corresponding one of the plurality of web browsers as a result of one of:

being programmed into the corresponding web browser prior to installation on the respective electronic device, being created by the corresponding web browser upon installation on the respective electronic device, and being transmitted by the server to the corresponding web browser;

receiving webpage requests transmitted by the plurality of web browsers via a network, each of said webpage requests including a URL and the user-neutral identifier of the corresponding web browser;

creating records of said webpage requests including said extracted user-neutral identifiers;

using the extracted user-neutral identifier of each webpage request to match the corresponding record to one of a plurality of profiles already created for respective user-neutral identifiers; and processing each of the records to:

create a new profile for the user-neutral identifier in the record if no match exists in the plurality of profiles already created, or update the one of the plurality of profiles already created, which matches the user-neutral identifier of the record, wherein each user-neutral identifier is registered prior to insertion into any user-initiated webpage request transmitted by the corresponding web browser, and wherein the user-neutral identifiers are registered in such manner as to ensure that they uniquely identify the web browser issuing each of said webpage requests from others of said plurality of web browsers, and maintain user anonymity by associating no user-specific information with any of the user-neutral identifiers.

15. The computer-readable medium of claim 14, wherein said process further comprises:
retrieving, in response to at least one of said webpage requests, a webpage from another server on said network corresponding to the URL in said webpage request; and
transmitting, the retrieved webpage to the web browser issuing said webpage request.

16. The computer-readable medium of claim 14, wherein said process further comprising:
categorizing one or more data elements in each of said records; and
aggregating the categorized data elements from each of said records within defined categories of the profile corresponding to the same user-neutral identifier.

17. The computer-readable medium of claim 16, wherein said one or more data elements include the URL of the corresponding webpage request.

18. The computer-readable medium of claim 17, wherein said one or more data elements include at least one of the following:
type of electronic device,
when the corresponding webpage request was transmitted, and
identity of service provider.

19. The computer-readable medium of claim 17, wherein said process further comprises:
analyzing data elements in said records to derive metrics for said profiles;
storing information from said profiles as a dataset within a relational database; and
providing an interface for said relational database for querying said dataset according to any or a combination of said defined categories and/or said metrics.

* * * * *